United States Patent
Noguchi et al.

(10) Patent No.: US 7,461,677 B2
(45) Date of Patent: Dec. 9, 2008

(54) PNEUMATIC TIRE HAVING BELL SHAPED WIDE WIDTH MAIN GROOVES

(75) Inventors: Youji Noguchi, Kodaira (JP); Akira Yagi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 291 days.

(21) Appl. No.: 11/226,309

(22) Filed: Sep. 15, 2005

(65) Prior Publication Data
US 2006/0060278 A1    Mar. 23, 2006

(30) Foreign Application Priority Data
Sep. 17, 2004   (JP)   ............... 2004-270747
Sep. 17, 2004   (JP)   ............... 2004-270748

(51) Int. Cl.
*B60C 11/11*   (2006.01)
(52) U.S. Cl. ............... 152/209.15; 152/209.22; 152/209.28; 152/904
(58) Field of Classification Search ............ 152/209.15, 152/209.18, 209.22, 209.28, 904
See application file for complete search history.

(56) References Cited

U.S. PATENT DOCUMENTS

| 2,551,238 | A | * | 5/1951 | Bohannon et al. | ...... | 152/209.28 |
| 5,105,864 | A |   | 4/1992 | Watanabe et al. |   |   |
| 5,154,783 | A | * | 10/1992 | Kuhr et al. | ............. | 152/209.22 |
| 5,360,043 | A | * | 11/1994 | Croyle et al. | ............. | 152/209.9 |
| 5,415,215 | A | * | 5/1995 | Covert et al. | ............. | 152/209.9 |
| D365,071 | S | * | 12/1995 | Hamamoto et al. | ........ | D12/558 |
| 5,702,545 | A | * | 12/1997 | Toyoshima et al. | ...... | 152/209.8 |
| 5,759,313 | A |   | 6/1998 | Shirai et al. |   |   |
| 6,123,129 | A | * | 9/2000 | Himuro | .................. | 152/209.28 |
| 6,520,230 | B1 | * | 2/2003 | Ratliff, Jr. | ............. | 152/209.28 |
| 6,935,392 | B2 | * | 8/2005 | Masaki | .................. | 152/209.28 |

FOREIGN PATENT DOCUMENTS

| EP | 0 648 622 A1 |   | 4/1995 |
| JP | 04-043105 A |   | 2/1992 |
| JP | 04-050006 A |   | 2/1992 |
| JP | 04-126612 A |   | 4/1992 |
| JP | 05-286315 | * | 11/1993 |
| JP | 05-338415 A |   | 12/1993 |
| JP | 09-226322 A |   | 9/1997 |
| JP | 11-091316 | * | 4/1999 |
| JP | 2002-103920 A |   | 4/2002 |
| JP | 2004-291775 | * | 10/2004 |

* cited by examiner

*Primary Examiner*—Steven D Maki
(74) *Attorney, Agent, or Firm*—Sughrue Mion, PLLC

(57) ABSTRACT

A pneumatic tire suitable for competitive sports has a specified tread pattern comprising a central region and both shoulder regions, in which a plurality of bell-shaped wide-width main grooves each extended substantially bell-shapedly into both sides approximately centering on an equator of the tire are disposed in the tread at a given interval in the circumferential direction of the tire wherein the bell-shaped wide-width main groove has specified inclination angles in the central region and the shoulder region and specified groove width and groove depth, and a width of a connecting land portion at a position coming the bells-shaped wide-width main grooves closest to each other is not less than 1.5 mm, and the tire has a given negative ratio at the central region.

10 Claims, 3 Drawing Sheets

US 7,461,677 B2

PNEUMATIC TIRE HAVING BELL SHAPED WIDE WIDTH MAIN GROOVES

BACKGROUND OF THE INVENTION

1. Field of the Invention

This invention relates to a pneumatic tire, and more particularly to a pneumatic tire having an excellent steering stability at wet condition and suitable for competitive sports, particularly racing cart.

2. Description of Related Art

In wet-type tires for competitive sports such as racing cart and the like is generally adopted a block-type tread pattern placing importance on a gripping stability when a water volume on a road surface is large in view of the safety. In such a tread pattern, however, there is a problem that as the water volume is decreased by the change of weather condition, the lateral slippage at the corner becomes large due to the lacking of rigidity in the blocks of the pattern and the performance deterioration is caused.

Since a racing cart is light in the load, it frequently adopts a fine block pattern mainly comprising four main grooves as a front tire or five main grooves as a rear tire continuing in a circumferential direction of the tire. As a result, as the water volume might become less, there is caused a remarkable performance deterioration that the lateral slippage becomes larger due to the phenomenon that the block rigidity is lacking or the lowering of lateral force produced in the cornering accompanied with the progress of wearing at shoulder blocks.

On the other hand, as a largish block pattern is adopted by placing importance on the performance when the water volume is small, the total groove area in the limited ground contact area is decreased, and hence the hydroplaning phenomenon is liable to be easily caused under a condition that the water volume is large to finally bring about the deterioration of the steering stability. In the tires for wet condition of changeable water volume on the road surface, therefore, it is a significant matter how to stably develop the gripping performance even in a broad range of water volume conditions.

As a technique on the improvement of the tread pattern in the pneumatic tire, for example, JP-A-5-338415 discloses a pneumatic tire wherein circumferential grooves extending in the circumferential direction of the tread and widthwise grooves extending obliquely upward are arranged in the tread and the widthwise groove is comprised of first groove segment and second groove segment to improve the resistance to uneven wear while ensuring the excellent gripping performance and high gripping force on the road surface in the high-speed cornering. Also, JP-A-9-226322 discloses a pneumatic tire having a tread pattern provided with two kinds of directional slanting grooves having given low inclination angle and high inclination angle with respect to the circumferential direction. Furthermore, JP-A-4-43105 and JP-A-4-126612 disclose a pneumatic tire wherein circumferential straight grooves extending in the circumferential direction and a plurality of slant grooves extending obliquely upward from a central region of the tread toward an end of the tread and opening to the tread end are arranged at given positions, respectively to improve the steering stability on a dry road surface and the drainage property on a wet road surface. In addition, JP-A-4-50006 discloses a pneumatic tire wherein curved grooves of hyperbolic shape are arranged at given angles on both sides of a main groove disposed in the circumferential direction as a technique of improving the tread pattern for the purpose of improving the drainage property. Moreover, JP-A-2002-103920 discloses a technique wherein position-adjusted and extended chamfer portions are arranged under given conditions in order to realize a tread of a pneumatic tire suitable for wide applications on paved road and off-the-road.

As to the improvement of the tread pattern in the pneumatic tire used under wet conditions, there are made various examinations as mentioned above, but it is demanded to develop pneumatic tires more improving the steering stability from the requirement of further improving the performances.

In the conventional wet tires for the racing cart, since the block pattern comprising four main circumferential grooves as a front tire or five main circumferential grooves as a rear tire is commonly used as previously mentioned, there is a problem that as the water volume becomes less, the wearing of the blocks located at the inside of the mounting becomes fast to bring about the lowering of the lateral force produced and the lowering of the braking force. As a counter-measure, it is mentioned to make the block large, which decreases the total groove area in the limited ground contact area of the tire for the racing cart being light in the load as long as it is positioned on an extension of the conventional block pattern based on the main circumferential grooves, so that it has not yet led to prevent the problem of easily causing the hydroplaning phenomenon or the occurrence of uneven wear along the main circumferential groove.

SUMMARY OF THE INVENTION

It is, therefore, an object of the invention to provide a pneumatic tire suitable for competitive sports, particularly a pneumatic tire for a racing cart having an excellent steering stability under wet conditions by improving the tread pattern to stably ensure the gripping performance compatible with the wide range of water volume conditions.

The inventors have made various studies for solving the above problems and found that the tread pattern is rendered into the construction mentioned later, whereby the lowering of the pattern rigidity or wear resistance in the shoulder portion, which results in the lowering of the lateral force even under a small water volume condition, can be prevented without damaging the drainage property and hence the stable running performances can be developed under conditions ranging from a large water volume to a small water volume, and as a result, the invention has been accomplished.

According to a first aspect of the invention, there is the provision of a pneumatic tire having a central region corresponding to $TW_{80} \times 35\%$ and both shoulder regions when $TW_{80}$ is a ground contact width of a tread in the tire mounted onto a rim of 4.5-5 inches under an internal pressure of 100 kPa and a load of 784 N, in which no wide-width main groove continuously extending in a circumferential direction is existent in the central region and the shoulder regions, characterized in that a plurality of bell-shaped wide-width main grooves each extended substantially bell-shapedly into both sides approximately centering on an equator of the tire are disposed in the tread to form a plurality of land parts each comprised of a center land portion, a shoulder land portion and a connecting land portion viewing from a front face of the tire in which an inclination angle with respect to the circumferential direction is 90-10° in the central region and 10-90° in the shoulder region and a groove width is 7-13% of $TW_{80}$ and a groove depth is 65-90% of a rubber thickness of the tread, and an interval (d1) on the equator between the bell-shaped wide-width main grooves adjoining to each other in the circumferential direction is 4.0-5.5% of a tire peripheral length and a width (d2) of the connecting land portion at a position coming the bells-shaped wide-width main grooves closest to each other is not less than 1.5 mm, and a negative ratio at the central region is 50-80%.

According to a second aspect of the invention, there is the provision of a pneumatic tire having a central region corresponding to $TW_{110} \times 35\%$ and both shoulder regions when $TW_{110}$ is a ground contact width of a tread in the tire mounted onto a rim of 7-5 inches under an internal pressure of 100 kPa and a load of 1078 N, in which no wide-width main groove continuously extending in a circumferential direction is existent in the shoulder regions, characterized in that a wide-width main groove extending straight in the circumferential direction and having a see-through width corresponding to 5-9% of $TW_{110}$ and a groove depth corresponding to 65-90% of a rubber thickness of the tread is disposed on an equator of the tire and a plurality of bell-shaped wide-width main grooves each extended substantially bell-shapedly into both sides approximately centering on an equator of the tire are disposed in the tread to form a plurality of land parts each comprised of a center land portion, a shoulder land portion and a connecting land portion viewing from a front face of the tire in which an inclination angle with respect to the circumferential direction is 90-10° in the central region and 10-90° in the shoulder region and a groove width is 7-13% of $TW_{110}$ and a groove depth is 65-90% of the rubber thickness of the tread, and an interval (d3) on the equator between the bell-shaped wide-width main grooves adjoining to each other in the circumferential direction is 4.0-5.5% of a tire peripheral length and a width (d4) of the connecting land portion at a position coming the bells-shaped wide-width main grooves closest to each other is not less than 1.5 mm, and a negative ratio at the central region is 55-65%.

According to the invention, a tread pattern based on the bell-shaped wide-width main grooves is adopted for substantially reducing the circumferential main grooves, and the circumferential main groove is removed from the shoulder portion violently causing the wearing, whereby the wear resistance can be largely improved while sufficiently ensuring the total groove area, and hence the improvements of the resistance to hydroplaning under a large water volume condition and the wear resistance under a small water volume condition and it is possible to realize a pneumatic tire capable of stably developing the steering stability irrespectively of the increase or decrease of the water volume.

BRIEF DESCRIPTION OF THE DRAWINGS

FIG. 1b is an enlarged section view taken along a line 1b-1b of FIG. 1a.

FIG. 2b is an enlarged section view taken along a line 2b-2b of FIG. 2a.

BEST MODE FOR CARRYING OUT THE INVENTION

The invention will be described below with reference to the preferred embodiments shown in the accompanying drawings.

Figure 1A:
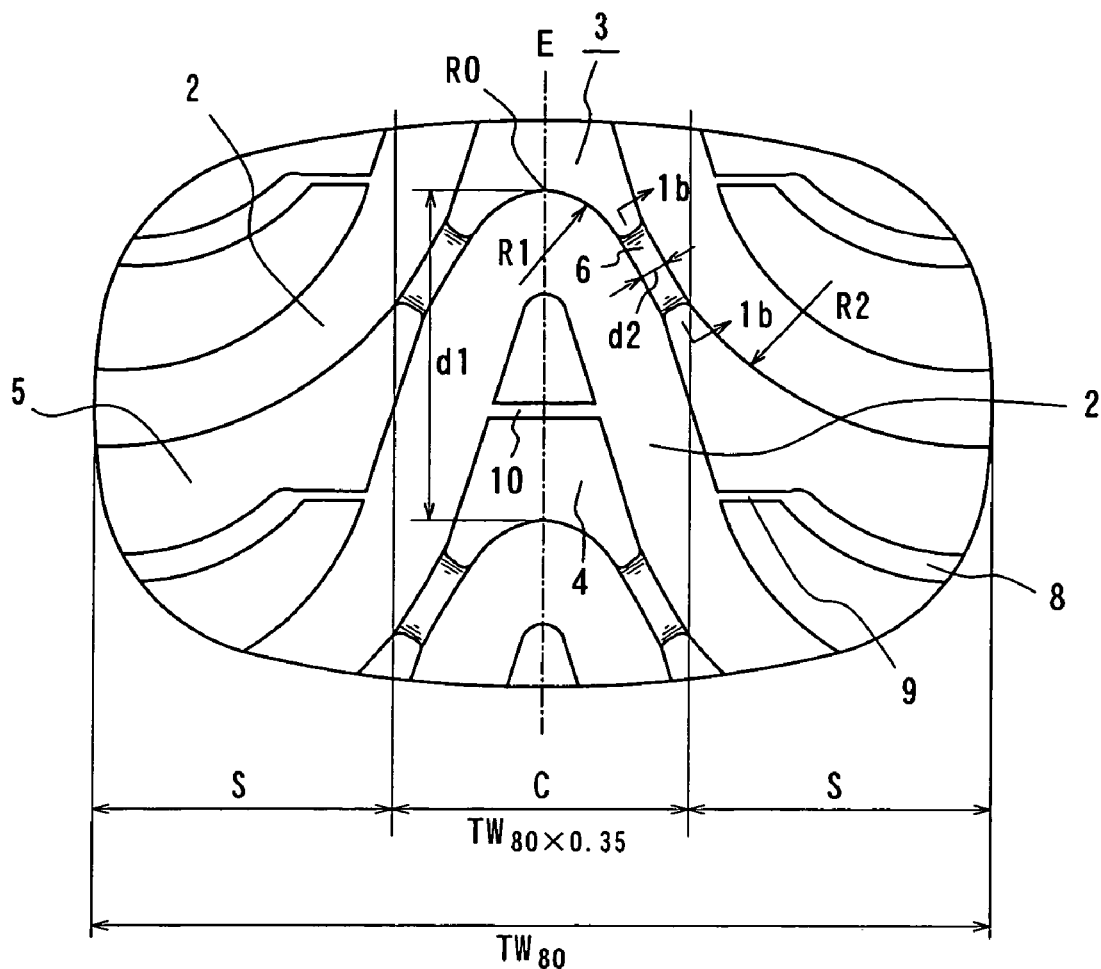
FIG. 1a is a partial plan view showing a tread pattern of a pneumatic tire according to the first aspect of the invention.

In FIG. 1a is shown a tread pattern of a pneumatic tire according to the first aspect of the invention. This tire has a central region C corresponding to $TW_{80} \times 35\%$ and both shoulder regions S when $TW_{80}$ is a ground contact width of a tread in the tire mounted on a rim of 4.5-5 inches under an internal pressure of 100 kPa and a load of 784 N.

In the first aspect of the invention, it is required that a wide-width main groove continuously extending in the circumferential direction of the tire is not arranged in the shoulder region S for reducing the wearing of the shoulder portion under a small water volume condition, and also a wide-width main groove continuously extending in the circumferential direction is not arranged in the central region, from which it is anticipated to lower the drainage property under a large water volume condition. In the invention, therefore, it is essential to arrange a plurality of bell-shaped wide-width main grooves 2 in the tread for sufficiently ensuring the drainage property under such a condition. As a result, a land part 3 is formed between the bell-shaped wide-width main grooves 2 adjoining to each other in the circumferential direction of the tire and comprised of a center land portion 4, a shoulder land portion 5 and a connecting land portion 6 located between the land portions 4 and 5.

The bell-shaped wide-width main groove 2 is extended substantially bell-shapedly into both sides approximately centering on an equator E of the tire viewing from a front face of the tire as shown in the figure, in which an inclination angle with respect to the circumferential direction is 90-10°, preferably 75-15° in the central region C and 10-90°, preferably 15-90° in the shoulder region S, and a groove width is 7-13%, preferably 9-11% of $TW_{80}$ and a groove depth is 65-90%, preferably 70-83% of a rubber thickness of the tread. Considering the drainage property, the groove width and groove depth of the bell-shaped wide-width main groove 2 are particularly important to satisfy the above range, respectively. If the width of the bell-shaped wide-width main groove 2 is too large, the groove area in the limited ground contact area becomes too large to decrease the area of the land part 3 contacting with ground and hence the sufficient gripping force can not be obtained.

If it is intended to mount the tire on a front wheel, a tire having a good response to the steering becomes preferable to a driver. When the above tire is used as a front tire, therefore, it is essential to arrange center land portions 4 in the central region C without arranging a wide-width main groove continuously extending in the circumferential direction. These center land portions 4 are formed by arranging the bell-shaped wide-width main grooves 2 in the central region C so as to adjoin to each other at a given interval in the circumferential direction. The interval (d1) between the bell-shaped wide-width main grooves 2 adjoining to each other in the circumferential direction or an interval between the mutually adjoining center land portions 4 is 4.0-5.5%, preferably 4.2-5.0% of a tire peripheral length. When the interval d1 is less than 4.0% of the tire peripheral length, the response to the steering becomes poor, while when it exceeds 5.5% of the tire peripheral length, it is difficult to ensure the groove volume required for the drainage property.

As shown in FIG. 1a, the bell-shaped wide-width main grooves 2 adjoining to each other in the circumferential direction come closest to each other in the vicinity of a boundary between the central region C and the shoulder region S. However, when the bell-shaped wide-width main grooves 2 come too close to each other, the rigidity of the connecting land portion 6 located between the center land portion 4 and the shoulder land portion 5 at a position coming the grooves 2 closest to each other lowers and hence the wear resistance is deteriorated. For this end, the width (d2) of the connecting land portion 6 at the position coming the grooves 2 closest to each other is required to be not less than 1.5 mm, preferably 2-3 mm.

In the tread pattern shown in FIG. 1a, the wide-width main groove continuously extending in the circumferential direction is not arranged in the shoulder region S for improving the wear resistance at the shoulder portion, and as a result, the drainage property at the central region C becomes more important. In order to ensure the drainage property causing no hydroplaning under a large water volume condition, it is required that the negative ratio of the central region C is not less than 50%. On the other hand, when the negative ratio exceeds 80%, the land portion 4 in the central region is extremely decreased to bring about the lowering of the gripping force or the wear resistance. In the invention, therefore, the negative ratio of the central region C is essential to be 50-80%, preferably 60-72%.

Since the connecting land portion 6 at the position coming the bell-shaped wide-width main grooves 2 closest to each other takes a smaller-width shape as mentioned above, it is required to make the width of such a connecting land portion 6 to an extent causing no problem on the wear resistance. From this viewpoint, it is preferable that in at least the vicinity of such a connecting land portion 6, a radius of curvature (R1) of a curved part connecting to a top (R0) of the bell-shaped wide-width main groove 2 at a leading side is not more than 35 mm and a radius of curvature (R2) of a bottom portion of the bell-shaped wide-width main groove 2 at a trailing side is not more than 80 mm.

Figure 1B:
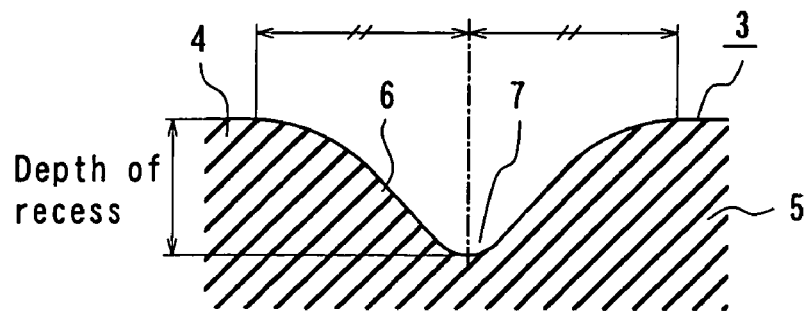

In the connecting land portion 6 at the position coming the bell-shaped wide-width main grooves 2 closest to each other in the circumferential direction, it is preferable to form a recess 7 communicating both the adjoining bell-shaped wide-width main grooves 2 for improving the drainage property. In FIG. 1b is shown an enlarged section view of the recess 7. Since the recess 7 is required to have a volume enough to cause the flow of water between the adjoining bell-shaped wide-width main grooves 2, the recess 7 has substantially a streamline shape at a section in which a height of the connecting land portion 6 is gradually decreased in the thickness direction of the tread as shown in FIG. 1b. It is preferable that a length of the recess 7 formed in the connecting land portion at a zone at least ranging from an outer surface of the tread to 20% of the depth of the main groove 2 is 80-200% of the width of the main groove 2 and a depth of the recess 7 at a position deepest from the outer surface of the tread is 60-100% of the depth of the main groove 2. Moreover, if the length of the recess in the length direction of the connecting land portion is too long, the gripping force in the center land portion 4 lowers, so that it is desirable to control the length of the recess 7 up to 200% of the width of the main groove 2.

Also, it is preferable that at least one sub-groove 8 is arranged in the shoulder land portion 5 formed in the shoulder region S between the adjoining bell-shaped wide-width main grooves 2 in order to cut water film penetrated beneath the shoulder land portion 5 to improve the drainage property. As a result, the shoulder land portion 5 has substantially a fork shape as shown in FIG. 1a. In order to provide a stable gripping force in both the longitudinal and lateral directions, the sub-groove 8 is required to have such a volume that a groove width is 15-60% of the width of the main groove 2 and a groove depth is 30-100% of the depth of the main groove 2. If the groove width of the sub-groove 8 becomes too large, the area of the shoulder land portion 5 contacting with ground is reduced and the rigidity thereof becomes weak to bring about the lowering of the gripping force in the lateral direction, so that the groove width is desirable to be controlled to 60% of the width of the main groove 2. Moreover, the sub-groove 8 may be opened or not be opened to an end of the shoulder in accordance with the rigidity required for the shoulder land portion 5, and in any case the effect aimed at the invention can be obtained without problem. As shown in FIG. 1a, a sipe 9 may be properly arranged between the sub-groove 8 and the bell-shaped wide-width main groove 2.

Furthermore, it is preferable that a sipe 10 communicating with the bell-shaped wide-width main groove 2 is arranged substantially in a center of the center land portion 4 in the circumferential direction in order to cut water film penetrated beneath the center land portion to improve the drainage property. If the sipe 10 becomes too large, the rigidity of the center land portion 4 is lacking to deteriorate the response to the steering, so that the sipe 10 is desirable to have a width of 0.5-2 mm and a depth corresponding to 30-80% of the depth of the main groove 2 in accordance with the block size of the center land portion 4.

The pneumatic tire according to the first aspect of the invention is suitable for competitive sports as mentioned above, and particularly it is suitable as a front tire of a racing cart. Such a tire is most effective when it is mounted onto a front wheel of the racing cart under wet condition.

Figure 2A:
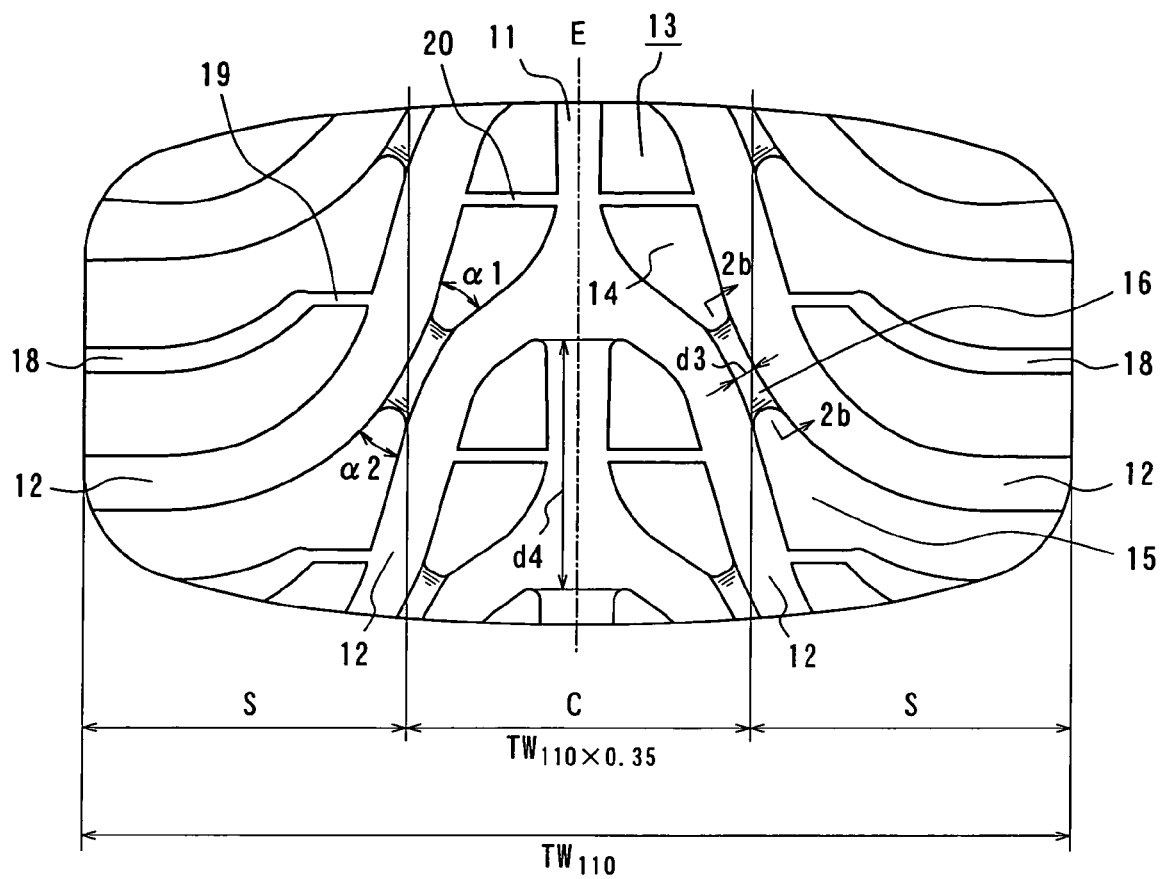
FIG. 2a is a partial plan view showing a tread pattern of a pneumatic tire according to the second aspect of the invention.

In FIG. 2a is shown a tread pattern of a pneumatic tire according to the second aspect of the invention. This tire has a central region C corresponding to $TW_{110} \times 35\%$ and both shoulder regions S when $TW_{110}$ is a ground contact width of a tread in the tire mounted on a rim of 7-5 inches under an internal pressure of 100 kPa and a load of 1078 N.

In the second aspect of the invention, it is required that a wide-width main groove continuously extending in the circumferential direction of the tire is not arranged in the shoulder region S, from which it is anticipated to lower the drainage property under a large water volume condition. In the invention, therefore, it is essential to arrange a plurality of bell-shaped wide-width main grooves 12 in the tread for sufficiently ensuring the drainage property under such a condition. As a result, a land part 13 is formed between the bell-shaped wide-width main grooves 12 adjoining to each other in the circumferential direction of the tire and comprised of a center land portion 14, a shoulder land portion 15 and a connecting land portion 16 located between the land portions 14 and 15.

The bell-shaped wide-width main groove 12 is extended substantially bell-shapedly into both sides approximately centering on an equator E of the tire viewing from a front face of the tire as shown in the figure, in which an inclination angle with respect to the circumferential direction is 90-10°, preferably 70-10° in the central region C and 10-90°, preferably 10-70° in the shoulder region S, and a groove width is 5-8%, preferably 5-7% of $TW_{110}$ and a groove depth is 65-90%, preferably 70-83% of a rubber thickness of the tread. Considering the drainage property, the groove width and groove depth of the bell-shaped wide-width main groove 12 are particularly important to satisfy the above range, respectively. If the width of the bell-shaped wide-width main groove 12 is too large, the groove area in the limited ground contact area becomes too large to decrease the area of the land part 13 contacting with ground and hence the sufficient gripping force can not be obtained.

When the above tire is mounted on a rear wheel, the lateral gripping force lowers under traction force, but if the drainage property is poor in the entrance into a pool, the lateral gripping force is further lacking and hence the lateral slippage is easily caused as compared with the front tire. For this end, the rear tire is required to attach importance to the drainage property as compared with the front tire in order to provide the stability of the gripping force on the pool. Therefore, the tire is essential to have a wide-width circumferential main groove 11 of substantially a straight form on the equator E of the tire.

In order to ensure the drainage property, the wide-width circumferential main groove 11 is required to have a volume that a see-through width is 5-9%, preferably 6-8% of $TW_{110}$ and a groove depth is 65-90%, preferably 70-83% of the rubber thickness of the tread. If the wide-width circumferential main groove 11 becomes too large, the area of the center land portion C is decreased and hence the sufficient gripping force can not be obtained.

As shown in FIG. 2a, the bell-shaped wide-width main grooves 12 adjoining to each other in the circumferential direction come closest to each other in the vicinity of a boundary between the central region C and the shoulder region S. However, when the bell-shaped wide-width main grooves 12 come too close to each other, the rigidity of the connecting land portion 16 located between the center land portion 14 and the shoulder land portion 15 at a position coming the grooves 12 closest to each other lowers and hence the wear resistance is deteriorated. For this end, the width (d4) of the connecting land portion 16 at the position coming the grooves 12 closest to each other is required to be not less than 1.5 mm, preferably 2-3 mm.

These center land portions 14 are formed by arranging the bell-shaped wide-width main grooves 12 in the central region C so as to adjoin to each other at a given interval in the circumferential direction. The interval (d3) between the bell-shaped wide-width main grooves 12 adjoining to each other in the circumferential direction is 4.0-5.5%, preferably 4.0-5.0% of a tire peripheral length. When the interval d3 is less than 4.0% of the tire peripheral length, the volume of the center land portion 14 becomes small to lower the rigidity of the center land portion 14 and hence the gripping force becomes small, while when it exceeds 5.5% of the tire peripheral length, the drainage property is deteriorated to bring about the lowering of the gripping force. In the illustrated embodiment, the bell-shaped wide-width main groove 12 is symmetrically extended on both sides substantially centering on the equator E of the tire, but the bell-shaped wide-width main grooves 12 may be off-set to each other on both sides about the equator E in the circumferential direction. In the latter case, the effects aimed at the invention can be obtained without problem.

In the tread pattern shown in FIG. 2a, the wide-width main groove continuously extending in the circumferential direction is not arranged in the shoulder region S for improving the wear resistance at the shoulder portion, and as a result, the drainage property at the central region C becomes more important. In order to ensure the drainage property causing no hydroplaning under a large water volume condition, it is required that the negative ratio of the central region C is not less than 55%. On the other hand, when the negative ratio exceeds 65%, the land portion 14 in the central region is extremely decreased to bring about the lowering of the gripping force or the wear resistance. In the invention, therefore, the negative ratio of the central region C is essential to be 55-65%, preferably 55-60%.

Since the connecting land portion 16 at the position coming the bell-shaped wide-width main grooves 12 closest to each other takes a smaller-width shape as mentioned above, it is required to make the width of such a connecting land portion 16 to an extent causing no problem on the wear resistance. From this viewpoint, it is preferable that viewing from the connecting land portion 16, an angle ($\alpha$1) of the center land portion 14 defined between the bell-shaped wide-width main grooves 12 is set to not less than 25° and an angle ($\alpha$2) of the shoulder land portion 15 defined between the bell-shaped wide-width main grooves 12 is set to not less than 25°, respectively.

Figure 2B:
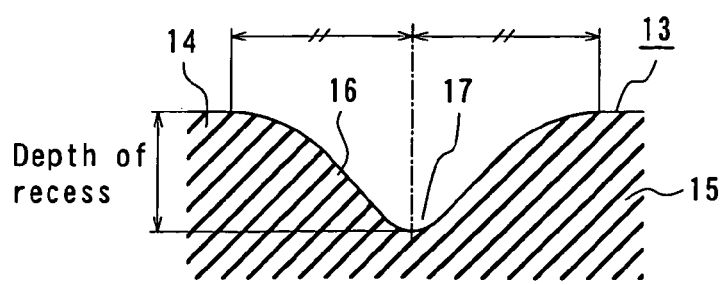

In the connecting land portion 16 at the position coming the bell-shaped wide-width main grooves 12 closest to each other in the circumferential direction, it is preferable to form a recess 17 communicating both the adjoining bell-shaped wide-width main grooves 12 for improving the drainage property. In FIG. 2b is shown an enlarged section view of the recess 17. Since the recess 17 is required to have a volume enough to cause the flow of water between the adjoining bell-shaped wide-width main grooves 12, the recess 17 has substantially a streamline shape at a section in which a height of the connecting land portion 16 is gradually decreased in the thickness direction of the tread as shown in FIG. 2b. It is preferable that a length of the recess 17 formed in the connecting land portion at a zone at least ranging from an outer surface of the tread to 20% of the depth of the main groove 12 is 80-200% of the width of the main groove 12 and a depth of the recess 17 at a position deepest from the outer surface of the tread is 60-100% of the depth of the main groove 12. Moreover, if the length of the recess in the length direction of the connecting land portion is too long, the gripping force in the center land portion 14 lowers, so that it is desirable to control the length of the recess 17 up to 200% of the width of the main groove 2.

Also, it is preferable that at least one sub-groove 18 is arranged in the shoulder land portion 15 formed in the shoulder region S between the adjoining bell-shaped wide-width main grooves 12 in order to cut water film penetrated beneath the shoulder land portion 15 to improve the drainage property. As a result, the shoulder land portion 15 has substantially a fork shape as shown in FIG. 2a. In order to provide a stable gripping force in both the longitudinal and lateral directions, the sub-groove 18 is required to have such a volume that a groove width is 30-65% of the width of the main groove 12 and a groove depth is 40-100% of the depth of the main groove 12. If the groove width of the sub-groove 18 becomes too large, the area of the shoulder land portion 15 contacting with ground is reduced and the rigidity thereof becomes weak to bring about the lowering of the gripping force in the lateral direction, so that the groove width is desirable to be controlled to 65% of the width of the main groove 12. Moreover, the sub-groove 18 may be opened or not be opened to an end of the shoulder in accordance with the rigidity required for the shoulder land portion 15, and in any case the effects aimed at the invention can be obtained without problem. As shown in FIG. 2a, a sipe 19 may be properly arranged between the sub-groove 18 and the bell-shaped wide-width main groove 12.

Furthermore, it is preferable that a sipe 20 communicating with the bell-shaped wide-width main groove 12 is arranged substantially in a center of the center land portion 14 in the circumferential direction in order to cut water film penetrated beneath the center land portion to improve the drainage property. If the sipe 20 becomes too large, the rigidity of the center land portion 14 is lacking to deteriorate the wear resistance, so that the sipe 20 is desirable to have a width of 0.5-2 mm and a depth corresponding to 40-80% of the depth of the main groove 12 in accordance with the block size of the center land portion 14.

The pneumatic tire according to the second aspect of the invention is suitable for competitive sports as mentioned above, and particularly it is suitable as a rear tire of a racing cart. Such a tire is most effective when it is mounted onto a rear wheel of the racing cart under wet condition.

The following examples are given in illustration of the invention and are not intended as limitations thereof.

Figure 3A:
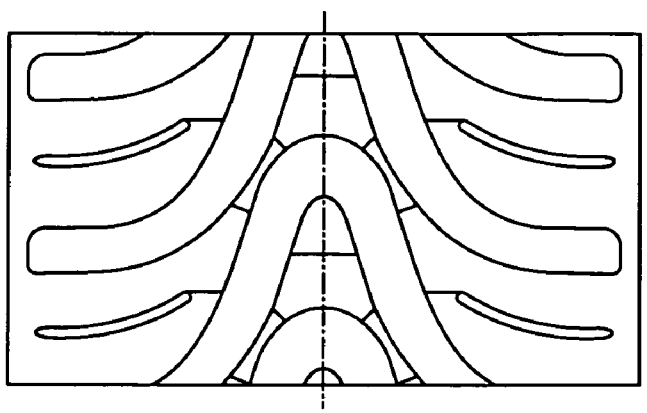
FIG. 3a is a partially developed plan view of a tread pattern when the pneumatic tire of FIG. 1a is used as a front tire.
Figure 3B:
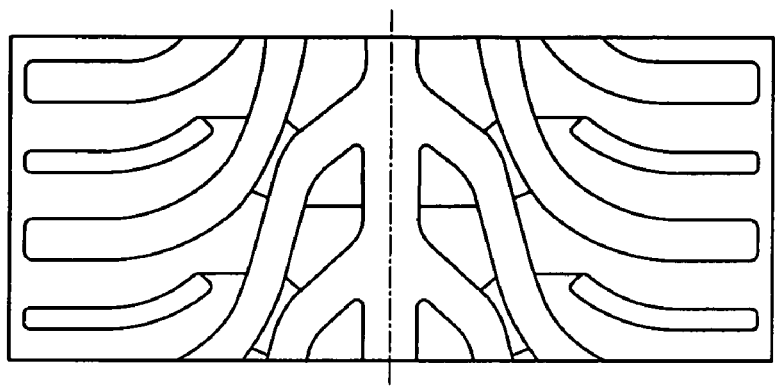
FIG. 3b is a partially developed plan view of a tread pattern when the pneumatic tire of FIG. 2a is used as a rear tire.
Figure 4A:
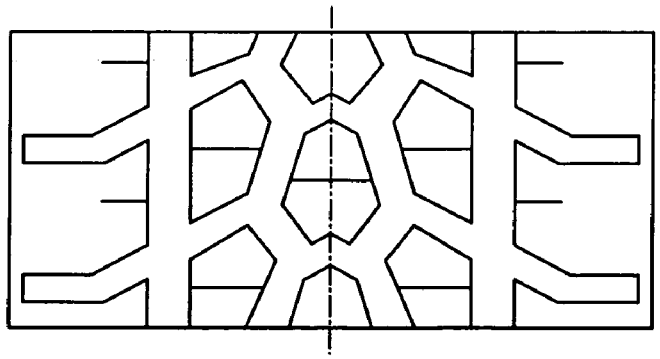
FIG. 4a is a partially developed plan view of a tread pattern when a conventional pneumatic tire is used as a front tire.

As Example 1, a pneumatic tire having a tread pattern shown in FIG. 1a (FIG. 3a) according to the first aspect of the invention is prepared under conditions shown in Table 1 and mounted onto a front wheel of a racing cart to conduct an actual running test for evaluating performances. As a rear tire is used a tire shown in FIG. 3b having a specification suitable as a combination with the front tire. For the comparison, Conventional Example 1 uses a front tire (FIG. 4a) prepared under conditions shown in Table 1 and a rear tire having a specification suitable as a combination with the front tire.

TABLE 1

|  | Example 1 | Conventional Example 1 |
| --- | --- | --- |
| Tire size | 4.5/10.0-5 | 4.5/10.0-5 |
| Negative ratio of central region in ground contact under internal pressure of 100 kPa and load of 784 N | 67% | 56% |
| Groove width of bell-shaped wide-width main groove 2 | 10% of $TW_{80}$ | 8% of $TW_{80}$ |
| Groove depth of bell-shaped wide-width main groove 2 (to rubber thickness of tread) | 77% | 77% |
| d1 (to tire peripheral length) | 4.5% | — |
| d2 | 3 mm | — |
| R1 | 20 mm | — |
| R2 | 40 mm | — |
| Length of recess (to width of main groove) | 100% | — |
| Depth of recess (to depth of main groove) | 80% | — |
| Inclination angle of bell-shaped wide-width main groove 2 in central region | 65-17° | — |
| Inclination angle of bell-shaped wide-width main groove 2 in shoulder region | 17-90° | — |
| Width of sub-groove 8 (to width of main groove) | 30% | — |
| Depth of sub-groove 8 (to depth of main groove) | 80% | — |
| Width of sipe 10 in substantially a center of center land portion | 1 mm | 1 mm |
| Depth of sipe 10 in substantially a center of center land portion (to depth of main groove) | 40% | 40% |

(1) Conditions of Actual Running Test
a. Test course: Sugao International cart course. The running is carried out under wet condition by sprinkling water onto a part of the course.
b. The running is carried out by making larger the water volume on a part of the course for evaluating the drainage property.
c. Running vehicle: racing cart and engine of FA class
d. Driver for evaluation: a professional driver acquired with an international racing cart license
e. Rim used: 4.5-5 (front), 7.0-5 (rear)
Internal pressure used: 100 kPa (front), 100 kPa (rear)

(2) Results of Actual Running Test
a. Lap time and wear
With respect to the tires of Example 1 and Conventional Example 1, the results evaluated on the average lap time and shoulder wear are shown in Table 2.

TABLE 2

|  | Example 1 | Conventional Example 1 |
| --- | --- | --- |
| Average lap time (seconds) | 39.0 | 39.2 |
| Shoulder wear | small | middle | b. Evaluation by feeling at a place having a large water volume

The tire of Conventional Example 1 is long in the slipping time on the place having the large water volume and does not maintain directional control, while the tire of Example 1 is strong in the gripping force and stable and good in the steering.

c. Evaluation by feeling at a place having middle to small water volume

In the tire of Example 1, the cart is easily controlled even in the rough steering as compared with the tire of Conventional Example 1. Also, the rear portion of the cart is sable at the moment of moving the front portion from braking, and the steering of the front portion becomes sharp and the driving is easy and good.

d. Total evaluation

The tire of Example 1 develops a stable gripping force irrespectively of the water volume as compared with the tire of Conventional Example 1, and is easy in the steering and can run at a fast time to provide good results.

Figure 4B:
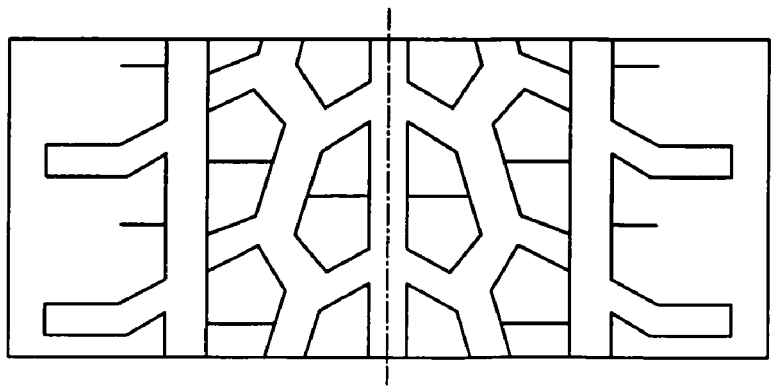
FIG. 4b is a partially developed plan view of a tread pattern when another conventional pneumatic tire is used as a rear tire.

As Example 2, a pneumatic tire having a tread pattern shown in FIG. 2a (FIG. 3b) according to the second aspect of the invention is prepared under conditions shown in Table 3 and mounted onto a rear wheel of a racing cart to conduct an actual running test for evaluating performances. As a front tire is used a tire shown in FIG. 3a having a specification suitable as a combination with the rear tire. For the comparison, Conventional Example 2 uses a rear tire (FIG. 4b) prepared under conditions shown in Table 3 and a front tire having a specification suitable as a combination with the rear tire.

TABLE 3

|  | Example 2 | Conventional Example 2 |
| --- | --- | --- |
| Tire size | 7.1/11.0-5 | 7.1/11.0-5 |
| Negative ratio of central region in ground contact under internal pressure of 100 kPa and load of 1078 N | 59% | 56% |
| Groove width of wide-width circumferential main groove 11 | 7% of $TW_{110}$ | 7% of $TW_{110}$ |
| Groove depth of wide-width circumferential main groove 11 (to rubber thickness of tread) | 77% | 77% |
| Groove width of bell-shaped wide-width main groove 12 | 5-7% of $TW_{110}$ | — |
| Groove depth of bell-shaped wide-width main groove 12 (to rubber thickness of tread) | 77% | — |
| d3 (to tire peripheral length) | 4.2% | — |
| d4 | 3 mm | — |
| $\alpha 1$ | 33° | — |
| $\alpha 2$ | 33° | — |
| Length of recess 17 (to width of main groove) | 140% | — |
| Depth of recess 17 (to depth of main groove) | 80% | — |
| Inclination angle of bell-shaped wide-width main groove 12 in central region | 50-12° | — |

TABLE 3-continued

|  | Example 2 | Conventional Example 2 |
|---|---|---|
| Inclination angle of bell-shaped wide-width main groove 12 in shoulder region | 12-90° | — |
| Width of sub-groove 18 (to width of main groove) | 63% | — |
| Depth of sub-groove 18 (to depth of main groove) | 100% | — |
| Width of sipe 20 | 1 mm | 1 mm |
| Depth of sipe 20 | 40% | 40% |

(1) Conditions of Actual Running Test a. Test course: Sugao International cart course. The running is carried out under wet condition by sprinkling water onto a part of the course.
b. The running is carried out by making larger the water volume on a part of the course for evaluating the drainage property.
c. Running vehicle: racing cart and engine of FA class
d. Driver for evaluation: a professional driver acquired with an international racing cart license
e. Rim used: 4.5-5 (front), 7.0-5 (rear)
Internal pressure used: 100 kPa (front), 100 kPa (rear)

(2) Results of Actual Running Test a. Lap time and wear
With respect to the tires of Example 2 and Conventional Example 2, the results evaluated on the average lap time and shoulder wear are shown in Table 4.

TABLE 4

|  | Example 2 | Conventional Example 2 |
|---|---|---|
| Average lap time (seconds) | 39.0 | 39.2 |
| Shoulder wear | small | middle | b. Evaluation by feeling at a place having a large water Volume
The tire of Conventional Example 2 is long in the slipping time on the place having the large water volume and does not maintain directional control, while the tire of Example 2 is strong in the gripping force and stable and good in the steering.

c. Evaluation by feeling at a place having middle to small water volume
In the tire of Example 2, the cart is easily controlled even in the rough steering as compared with the tire of Conventional Example 1. Also, the rear portion of the cart is sable at the moment of moving the front portion from braking, and the steering of the front portion becomes sharp and the driving is easy and good.

d. Total evaluation
The tire of Example 2 develops a stable gripping force irrespectively of the water volume as compared with the tire of Conventional Example 2, and is easy in the steering and can run at a fast time to provide good results.

Particularly, better results can be obtained by combining the pneumatic tire according to the first aspect of the invention with the pneumatic tire according to the second aspect of the invention as a front tire and a rear tire of a racing cart.

What is claimed is:

1. A pneumatic tire having a central region corresponding to $TW_{80} \times 35\%$ and both shoulder regions when $TW_{80}$ is a ground contact width of a tread in the tire mounted onto a rim of 4.5-5 inches under an internal pressure of 100 kPa and a load of 784 N, in which no wide-width main groove continuously extending in a circumferential direction is existent in the central region and the shoulder regions, characterized in that a plurality of bell-shaped wide-width main grooves each extended substantially bell-shapedly into both sides approximately centering on an equator of the tire are disposed in the tread to form a plurality of land parts each comprised of a center land portion, a shoulder land portion and a connecting land portion viewing from a front face of the tire in which an inclination angle with respect to the circumferential direction is 90-10° in the central region and 10-90° in the shoulder region and a groove width is 7-13% of $TW_{80}$ and a groove depth is 65-90% of a rubber thickness of the tread, and an interval (d1) on the equator between the bell-shaped wide-width main grooves adjoining to each other in the circumferential direction is 4.0-5.5% of a tire peripheral length and a width (d2) of the connecting land portion at a position coming the bells-shaped wide-width main grooves closest to each other is not less than 1.5 mm, and a negative ratio at the central region is 50-80%;
wherein the bell-shaped wide width main grooves are substantially symmetric with respect to the equatorial plane,
wherein at least one sub-groove is arranged in the shoulder land portion formed in the shoulder region between the adjoining bell-shaped wide-width main grooves to render the shoulder land portion into a fork shape, and a groove width of the sub-groove is 15-60% of the width of the main groove and a groove depth of the sub-groove is 30-100% of the depth of the main groove.

2. A pneumatic tire according to claim 1, wherein in at least the vicinity of the connecting land portion, a radius of curvature (R1) of a curved part connecting to a top (R0) of the bell-shaped wide-width main groove at a leading side is not more than 35 mm and a radius of curvature (R2) of a bottom portion of the bell-shaped wide-width main groove at a trailing side is not more than 80 mm.

3. A pneumatic tire according to claim 1, wherein in the connecting land portion at the position coming the bell-shaped wide-width main grooves closest to each other in the circumferential direction is formed a recess communicating both the adjoining bell-shaped wide-width main grooves, and the recess has substantially a streamline shape at a section in which a height of the connecting land portion is gradually decreased in the thickness direction of the tread and a length of the recess formed in the connecting land portion at a zone at least ranging from an outer surface of the tread to 20% of the depth of the main groove is 80-200% of the width of the main groove and a depth of the recess at a position deepest from the outer surface of the tread is 60-100% of the depth of the main groove.

4. A pneumatic tire according to claim 1, wherein a sipe communicating with the bell-shaped wide-width main groove is arranged substantially in a center of the center land portion in the circumferential direction, and a width of the sipe is 0.5-2 mm and a depth of the sipe is 30-80% of the depth of the main groove.

5. A pneumatic tire according to claim 1, wherein said tire is a front tire of a racing cart.

6. A pneumatic tire having a central region corresponding to $TW_{110} \times 35\%$ and both shoulder regions when $TW_{110}$ is a ground contact width of a tread in the tire mounted onto a rim of 7-5 inches under an internal pressure of 100 kPa and a load of 1078 N, in which no wide-width main groove continuously extending in a circumferential direction is existent in the shoulder regions, characterized in that a wide-width main groove extending straight in the circumferential direction and having a see-through width corresponding to 5-9% of $TW_{110}$ and a groove depth corresponding to 65-90% of a rubber thickness of the tread is disposed on an equator of the tire and a plurality of bell-shaped wide-width main grooves each extended substantially bell-shapedly into both sides approximately centering on an equator of the tire are disposed in the tread to form a plurality of land parts each comprised of a center land portion, a shoulder land portion and a connecting land portion viewing from a front face of the tire in which an inclination angle with respect to the circumferential direction is 90-10° in the central region and 10-90° in the shoulder region and a groove width is 7-13% of $TW_{110}$ and a groove depth is 65-90% of the rubber thickness of the tread, and an interval (d3) on the equator between the bell-shaped wide-width main grooves adjoining to each other in the circumferential direction is 4.0-5.5% of a tire peripheral length and a width (d4) of the connecting land portion at a position coming the bells-shaped wide-width main grooves closest to each other is not less than 1.5 mm, and a negative ratio at the central region is 55-65%;

wherein the bell-shaped wide width main grooves are substantially symmetric with respect to the equatorial plane, wherein at least one sub-groove is arranged in the shoulder land portion formed in the shoulder region between the adjoining bell-shaped wide-width main grooves to render the shoulder land portion into a fork shape, in which a groove width is 30-65% of the width of the main groove and a groove depth is 40-100% of the depth of the main groove.

7. A pneumatic tire according to claim 6, wherein viewing from the connecting land portion at the position coming the bell-shaped wide-width main grooves closest to each other, an angle ($\alpha$1) of the center land portion defined between the bell-shaped wide-width main grooves is set to not less than 25° and an angle ($\alpha$2) of the shoulder land portion defined between the bell-shaped wide-width main grooves is set to not less than 25°.

8. A pneumatic tire according to claim 6, wherein in the connecting land portion at the position coming the bell-shaped wide-width main grooves closest to each other in the circumferential direction is formed a recess communicating both the adjoining bell-shaped wide-width main grooves, and the recess has substantially a streamline shape at a section in which a length of the recess formed in the connecting land portion at a zone at least ranging from an outer surface of the tread to 20% of the depth of the main groove is 80-200% of the width of the main groove and a depth of the recess at a position deepest from the outer surface of the tread is 60-100% of the depth of the main groove.

9. A pneumatic tire according to claim 6, wherein a sipe communicating with the bell-shaped wide-width main groove is arranged substantially in a center of the center land portion in the circumferential direction in which the sipe has a width of 0.5-2 mm and a depth corresponding to 40-80% of the depth of the main groove.

10. A pneumatic tire according to claim 6, wherein said tire is a rear tire of a racing cart.

* * * * *